United States Patent
Tseng

[19]

[11] Patent Number: 6,144,904
[45] Date of Patent: Nov. 7, 2000

[54] INSTANT DETECTION / DIAGNOSIS OF ABRUPT BIAS FAULT IN SIGNALS OF VEHICLE MOTION SENSORS

[75] Inventor: Hongtei Eric Tseng, Canton, Mich.

[73] Assignee: Ford Global Technologies, Inc., Dearborn, Mich.

[21] Appl. No.: 09/218,280

[22] Filed: Dec. 22, 1998

[51] Int. Cl.[7] .................................................. G01R 23/00
[52] U.S. Cl. ................... 701/34; 701/29; 701/43; 340/825.06; 340/825.16; 340/438; 180/170; 303/122; 303/122.05; 303/140; 303/146; 303/147
[58] Field of Search .................................. 701/34, 63, 43, 701/29, 31, 32; 303/122, 122.05, 138, 140, 146, 147; 340/825.06, 825.16, 438; 180/170, 197

[56] References Cited

U.S. PATENT DOCUMENTS

| | | | |
|---|---|---|---|
| 4,041,470 | 8/1977 | Siane et al. | 701/35 |
| 5,457,632 | 10/1995 | Tagawa et al. | 701/43 |
| 5,707,117 | 1/1998 | Hu et al. | 303/122.08 |
| 6,014,598 | 1/2000 | Duyar et al. | 701/29 |

FOREIGN PATENT DOCUMENTS

| | | |
|---|---|---|
| 404135976 | 9/1990 | Japan . |
| 404353066 | 5/1991 | Japan . |
| 406186250 | 12/1992 | Japan . |
| 406340265 | 5/1993 | Japan . |
| 407010023 | 6/1993 | Japan . |
| 409290765 | 4/1996 | Japan . |
| 409297153 | 5/1996 | Japan . |
| 409301212 | 5/1996 | Japan . |

*Primary Examiner*—William A. Cuchlinski, Jr.
*Assistant Examiner*—Yonel Beaulieu
*Attorney, Agent, or Firm*—Gregory P. Brown

[57] ABSTRACT

A system and method for enabling an abrupt bias fault in a vehicle motion sensor (24), such as a yaw rate sensor or a lateral acceleration sensor to be both quickly and accurately diagnosed. When a potential fault is first indicated, it is signaled as true only if the vehicle is in a stable state and vehicle vibration is ruled out as a cause of abrupt signal change. Processing of signals is conducted by microprocessor.

14 Claims, 6 Drawing Sheets

6,144,904

1

INSTANT DETECTION / DIAGNOSIS OF ABRUPT BIAS FAULT IN SIGNALS OF VEHICLE MOTION SENSORS

BACKGROUND OF THE INVENTION

1. Field of the Invention

This invention relates generally to on-board motion sensors, such as yaw rate sensors and lateral acceleration sensors of automotive vehicles. More particularly, the invention relates to the detection and/or diagnosis of abrupt bias faults in such sensors.

2. Background Information

Vehicle sensors, such as yaw rate sensors and lateral acceleration sensors, provide important inputs to certain automotive vehicle control systems. Such control systems may utilize microprocessors that process yaw rate and/or lateral acceleration data from such sensors with other data to cause adjustments in and/or actuations of certain vehicle control systems that involve vehicle dynamics and/or vehicle operation.

In the case of a moving vehicle, input data to the systems may be updated at sufficiently fast update rates that the instantaneous value of the data very closely tracks the value of the data in real time. If a sensor fault should occur during such times, it is considered desirable that the fault be both quickly and accurately diagnosed. An abrupt bias fault in such sensors is one fault whose prompt detection and diagnosis is desirable.

A preliminary novelty search in connection within this invention developed U.S. Pat. Nos. 5,457,632 and 5,707,117; and the following numbered, English language Patent Abstracts of Japan: 404 135 976; 404 353 066; 406 186 250; 406 340 265; 407 010 023; 409 290 765; 409 297 153; and 409 301 212.

SUMMARY OF THE INVENTION

A general aspect of the present invention is to enable certain faults in vehicle motion sensors, an abrupt bias fault in particular, to be both quickly and accurately diagnosed. An advantage of the invention is that it can be embodied either entirely, or at least in large part, in an existing vehicle system without additional hardware. This is because the disclosed solutions provided by implementation of the invention are in the form of software in programmed into existing microprocessor-based systems. These solutions are especially desirable for mass-produced automotive vehicles because they accomplish new and useful functions in a cost-effective manner.

One generic aspect of the invention relates to a system for detecting an abrupt bias fault in an on-board motion sensor in an automotive vehicle, and comprising in combination with the motion sensor: signal sources that are independent of the sensor, including signal sources providing signals useful in calculating a motion that at least approximately corresponds to motion represented by a signal of the sensor; and a processor a) for processing the signals from the sensor and from the sources that are independent of the sensor to yield a calculation at least approximately corresponding to motion represented by the signal of the sensor, b) for processing the calculation and the signal from the sensor to calculate deviation of one from the other, and c) for processing the calculated deviation for distinguishing a frequency component indicative of such an abrupt bias fault from a frequency component that is not indicative of such a fault.

2

Within that generic aspect, further aspects relate to: the processor, upon having distinguished a frequency component indicative of an abrupt bias fault, processing the sensor signal for noise induced by vehicle vibration to either validate or invalidate the distinguished frequency component indicative of an abrupt bias fault; the inclusion of signal sources useful in distinguishing a stable state of the vehicle from other than a stable state, and the processor further processing a) signals from the signal sources useful in distinguishing a stable state of the vehicle from other than a stable state and b) the result of the processing of the calculated deviation that distinguished a frequency component indicative of such an abrupt bias fault from a frequency component not indicative of such a fault; the processor signaling the occurrence of a true fault in consequence of both fault validation by the noise processing and by determination of stable vehicle state; the processor at least approximately normalizing the calculated deviation for longitudinal vehicle velocity, processing the approximately normalized calculated deviation to obtain its value at a frequency of interest, and weighting the value of the approximately normalized deviation by its value at the frequency of interest to create a residue; the processor comparing the residue to a threshold for distinguishing a residue that is indicative of an abrupt bias fault from a residue that is not indicative of an abrupt bias fault.

Another generic aspect relates to a method for detecting an abrupt bias fault in an on-board motion sensor in an automotive vehicle comprising: processing signals from signal sources that are independent of the sensor to calculate a motion that at least approximately corresponds to motion represented by a signal of the sensor; calculating deviation between the sensor signal and the calculated motion; and processing the calculated deviation for distinguishing a frequency component indicative of such an abrupt bias fault from a frequency component that is not indicative of such a fault.

Further method aspects include: processing for noise induced by vehicle vibration to either validate or invalidate the distinguished frequency component indicative of an abrupt bias fault; processing signals from signal sources useful in distinguishing a stable state of the vehicle from other than a stable state; signaling the occurrence of a true fault in consequence of both fault validation by the noise processing and determination of stable vehicle state; at least approximately normalizing the calculated deviation for longitudinal vehicle velocity, processing the approximately normalized calculated deviation to obtain its value at a frequency of interest, and weighting the value of the approximately normalized deviation by its value at the frequency of interest to create a residue; and comparing the residue to a threshold for distinguishing a residue that is indicative of an abrupt bias fault from a residue that is not indicative of an abrupt bias fault.

The foregoing, and other inventive aspects, will be seen in the ensuing description and claims.

BRIEF DESCRIPTION OF THE DRAWINGS

The drawings that will now be briefly described are incorporated herein to illustrate the inventive principles via an exemplary preferred embodiment and a best mode presently contemplated for carrying out those principles.

DESCRIPTION OF THE PREFERRED EMBODIMENT(S)

Figure 1:
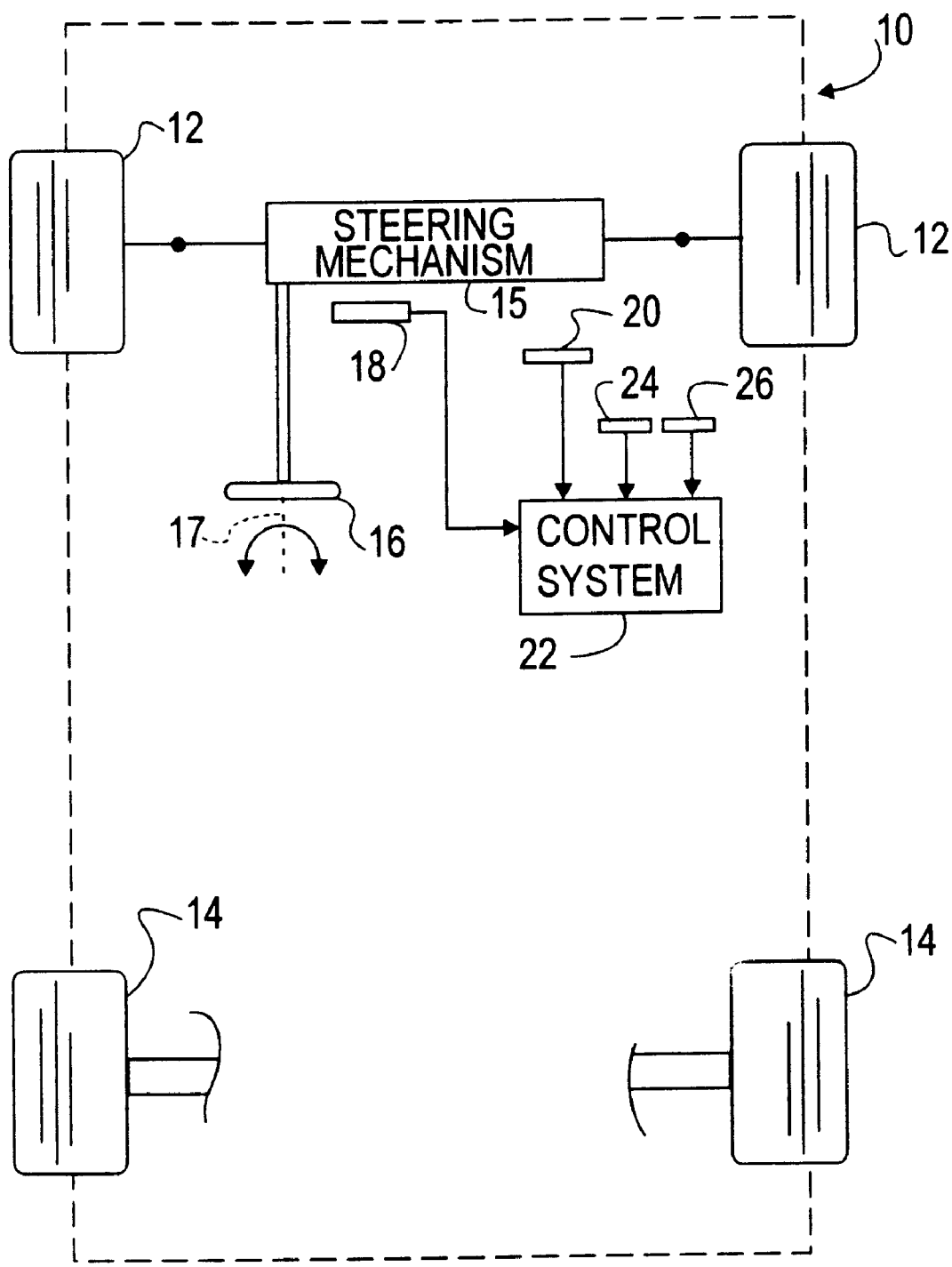
FIG. 1 is a schematic top plan view of an automotive vehicle containing a control system that has a vehicle motion sensor input.

FIG. 1 shows an automotive vehicle 10 comprising a chassis having a pair of steerable front wheels 12 and a pair of rear wheels 14. Depending on whether the vehicle is a front-wheel, rear-wheel, or all-wheel drive vehicle, one or both pairs of wheels are powered by the vehicle's powertrain.

Vehicle 10 also includes a steering system that comprises the usual steering wheel 16 coupled by a steering mechanism 15 to front wheels 12. The steering wheel rotates about an axis of rotation 17 to turn wheels 12, and a steering wheel sensor 18 is associated with the steering wheel to provide an electric signal related to steering wheel operation. For purposes of the disclosed embodiment of the present invention, the steering wheel sensor provides a steering angle signal indicative of the extent to which wheels 12 are being turned by steering wheel 16, and hence the extent to which the vehicle driver is turning the vehicle.

Another data input that is used in the disclosed embodiment of the present invention is vehicle longitudinal speed, and such a signal is obtained from any suitable source, such as the vehicle speed signal that is already available from an ABS system of the vehicle where such signal is derived from wheel speed sensors, marked by the reference 20.

Examples of control systems, such as system 22 in vehicle 10, that may utilize as inputs, one or more vehicle motion sensors, such as an on-board sensor 24 in vehicle 10, include microprocessor-based automatic brake control systems and automatic suspension control systems that control a vehicle's brakes and suspension respectively in accordance with sensed conditions related to vehicle dynamics during over-the-road operation of the vehicle.

When operating properly, a sensor 24 that is properly selected for automotive vehicle usage provides a signal that is substantially a real-time representation of motion, such as velocity or acceleration/deceleration, either linear or rotational, referenced to a particular axis. If sensor 24 is a yaw rate sensor, it provides a signal of the vehicle's yaw rate.

During vehicle operation, it is possible that sensor 24 may experience a sudden and unexpected fault, such as an abrupt bias fault. Such a fault may ultimately manifest itself as error in the vehicle motion signal that it is intended to accurately represent. In such event, it is desirable to flag the error, and possibly prevent it from influencing the control system to which the motion sensor signal is an input. However, before such a fault can be flagged, it must be ascertained that the change in the sensor's signal is in fact due to occurrence of a fault rather than sudden changes in the motion that the sensor is faithfully following. And, if the sudden change in the signal is in fact due to fault, it is considered desirable that it be identified as such in its incipiency so that any measures that may be deemed appropriate can be taken before the fault manifests itself in control system response that may be considered inappropriate for true prevailing conditions.

In the example shown in FIG. 1, vehicle 10 further includes a second sensor 26, a lateral acceleration sensor in particular, that provides another input to the microprocessor-based control system. For detecting an abrupt bias fault in sensor 24, the system executes a series of programmed algorithms represented by FIG. 2.

The vehicle longitudinal speed signal from the source 20 and the steering angle signal from sensor 18 are processed in accordance with a nominal vehicle model, as represented by block 30 in the flow diagram, to obtain a model reference yaw rate. During a step represented by block 32, that result is processed with the yaw rate signal measured by sensor 24 to obtain a deviation value representing deviation between the two.

Next, the computed deviation value is processed by a residue generation filter, as represented by block 34, to calculate a residue. Detail of the residue filter will be described later. The calculated residue is then compared against a threshold criterion. This comparison step is represented by the block labeled 38.

The threshold criterion is determined through use of a look-up table that is parameterized by steering angle measurement from sensor 18, lateral acceleration measurement from sensor 26, and vehicle speed measurement from sensor 20. Block 36 represents use of that look-up table to provide a residue detection threshold based on the lateral acceleration signal from sensor 26.

The vehicle stable criterion is obtained from the status of a flag that distinguishes between the vehicle being in a stable state and being in other than a stable state. A detailed illustration of how such a distinction is made appears in FIG. 4, which will be explained later. The vehicle must be in a stable state for further processing to occur after step 38; if the vehicle is not in stable state, no conclusion is drawn about a possible fault, for the moment.

If the vehicle is in a stable state and the calculated residue is less than the residue detection value determined by the look-up process represented by block 36, then the comparison performed in accordance with block 38, will result in a conclusion that there is no incipient abrupt bias fault in sensor 24, and the steps that have been described will repeat. Thus, abrupt bias fault detection is a continuing iterative process.

If the vehicle is stable but the calculated residue is greater than the residue detection value, then the comparison performed in accordance with block 38, will result in a conclusion that there may be an incipient abrupt bias fault in sensor 24. This sets a yaw rate fault flag, represented by block 40. Before an actual fault is confirmed however, a determination is made that certain high frequency vehicle vibration, such as certain road and/or console vibrations, is not the cause. That determination is represented by the block labeled 42 in FIG. 2.

Figure 5:
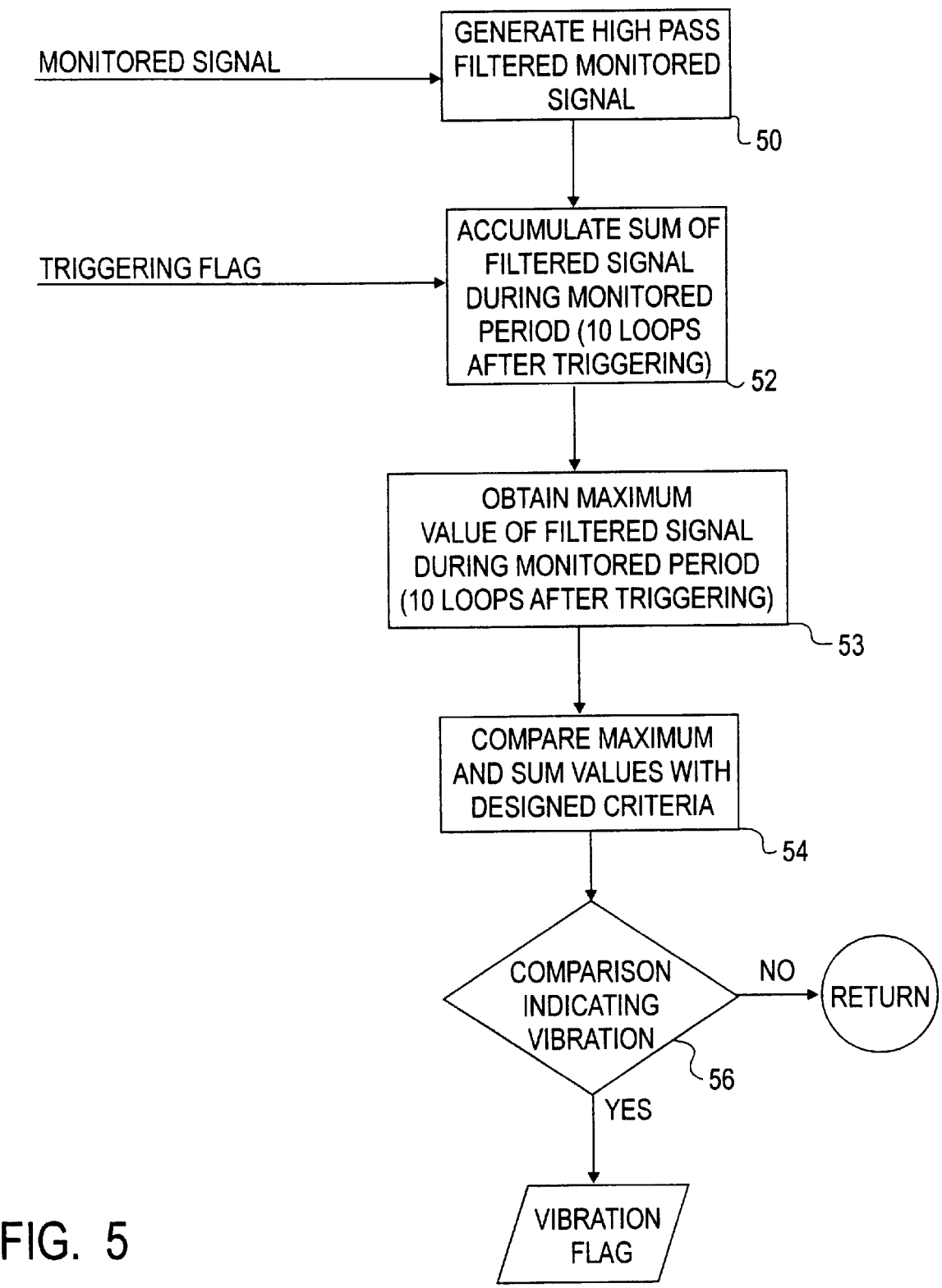
FIG. 5 is a schematic flow diagram showing more detail of one of the blocks in the flow diagrams of both FIGS. 2 and 3.

Block 42 represents steps of an algorithm shown by FIG. 5. Execution of the algorithm is triggered by the setting of the yaw rate fault flag. The yaw rate signal is passed through a high-pass filter, as in the block represented by the numeral 50 in FIG. 5, for a predetermined number of passes through the loop of FIG. 2, ten passes in this example. During each pass, the measured value of the filtered signal is added to a register (step 52 in FIG. 5), and at the end of the ten passes, the sum of the ten measurements is compared (step 54)

against the largest single measurement (step 53). The result is used to determined whether or not vibration is responsible for the yaw rate fault flag.

Figure 2:
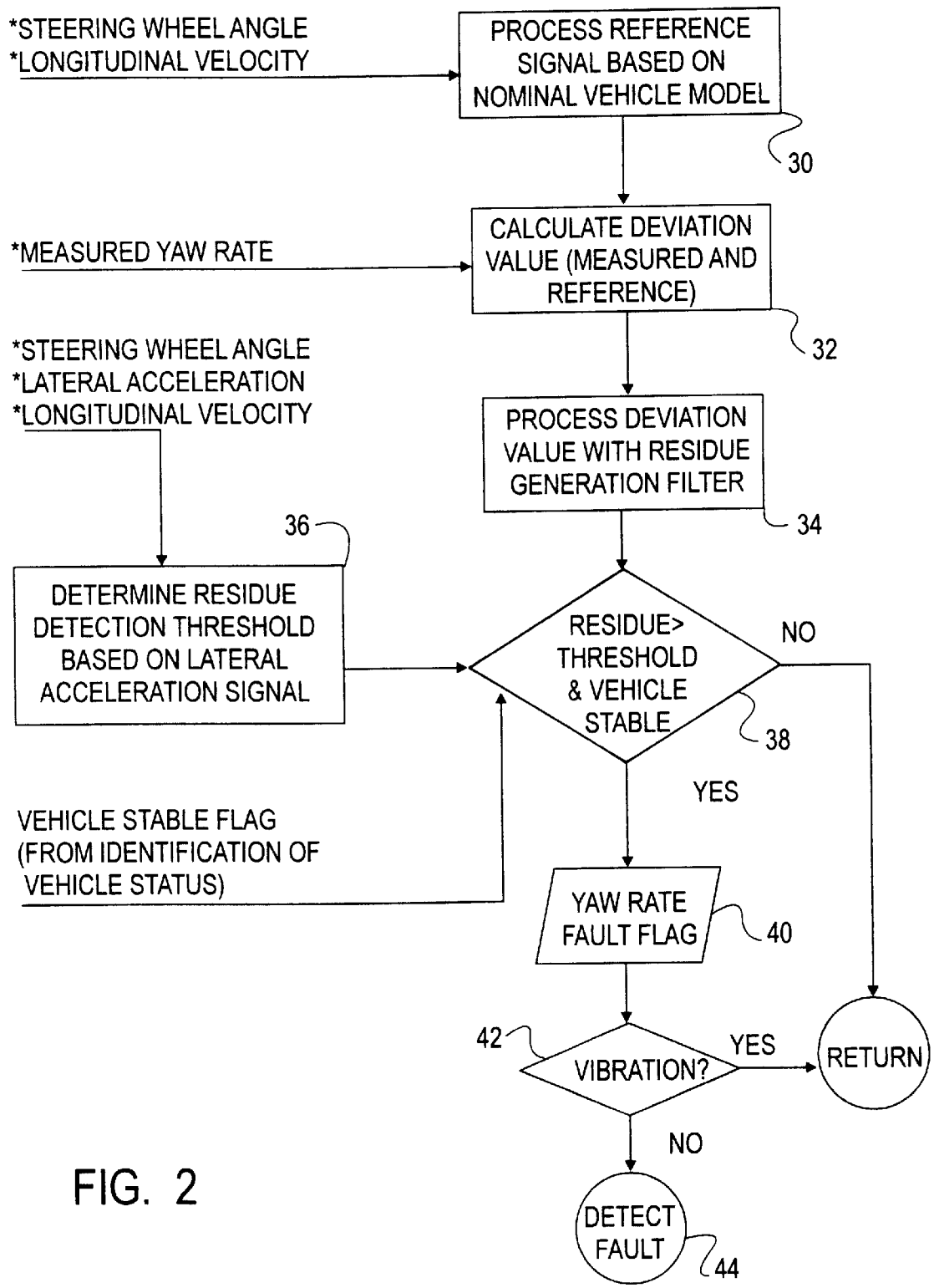
FIG. 2 is a schematic flow diagram illustrating principles of abrupt bias fault detection in a yaw rate sensor in accordance with the present invention.

If it is, the fault flag is reset and the process represented by FIG. 2 continues monitoring for a fault. If vibration is determined not to be the cause, then an incipient abrupt bias fault is diagnosed as true (step 44 in FIG. 2).

Figure 4:
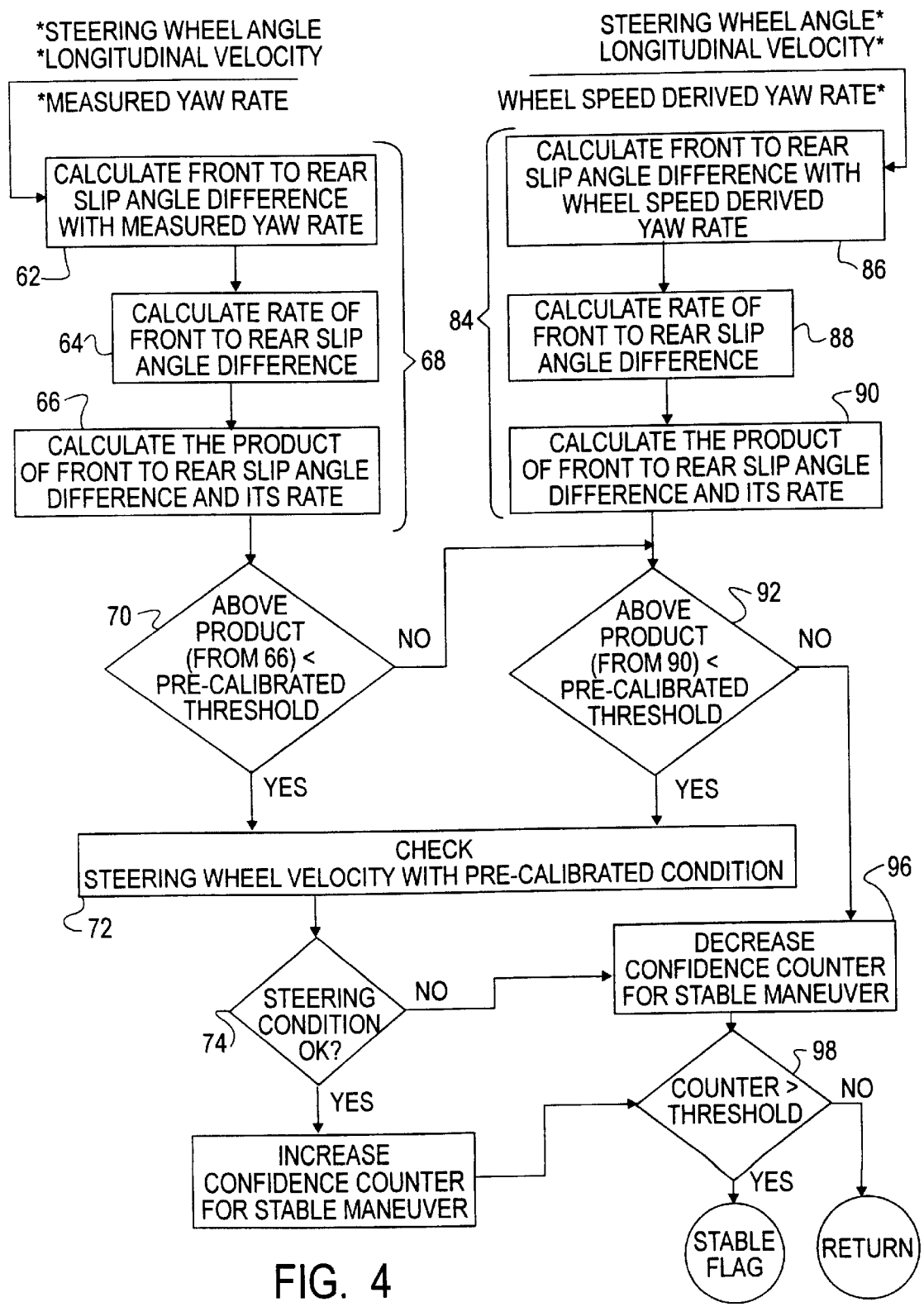
FIG. 4 is a schematic flow diagram showing detail of the derivation of a vehicle stable flag for use in the flow diagrams of both FIGS. 2 and 3.

For maximizing the probability that a potential fault signal is not due to the vehicle being in other than a vehicle stable condition, the method of FIG. 4 determines the state of a vehicle stable flag, and is performed as a component of the overall fault detection method. Certain calculations involve the yaw rate sensor signal. These calculations are depicted by steps 62, 64, 66 in branch 68. Step 62 utilizes the yaw rate sensor signal, the steering wheel angle signal, and the vehicle longitudinal velocity (vehicle speed) signal to calculate the front to rear slip angle difference. Step 64 calculates the front to rear slip angle difference rate, and step 66 calculates the product of front to rear slip angle difference and the front to rear slip angle difference rate. Step 70 determines if that product is less than a calibrated threshold.

If the pre-calibrated threshold of step 70 is not exceeded, steps 72 and 74 collectively check steering wheel velocity against a pre-calibrated condition to determine if the steering wheel is being turned too fast. Turning that is too fast suggests that the vehicle operation may be in the process of moving out of vehicle stable state; turning that is not too fast suggests that the vehicle is not.

Therefore, if the threshold of step 70 is not being exceeded and if the steering wheel is not being turned too fast, continued vehicle stability is indicated.

Because the method of FIG. 4 is performed by microprocessor calculations, it is repeatedly performed at very short intervals as the vehicle is traveling. Therefore, rather than utilizing only a single iteration to reach a determination of vehicle stability, a counter, called a confidence counter, is either incremented or decremented depending on the result of each iteration of the method of FIG. 4.

Before describing operation of the confidence counter, description of a second branch 84 that is parallel to branch 68 will be given. Branch 84 processes a wheel-speed-derived yaw rate signal in accordance with steps designated 86, 88, and 90, in analogous manner to the calculations of steps 62, 64, and 66. Applicable relationships are symbolized and defined as follows:

$$\alpha_{f2r} \cdot \frac{d\alpha_{f2r}}{dt} < c$$

where $$\alpha_{f2r} := \alpha_f - \alpha_r = G\delta - \frac{L\omega}{u}$$

and where G is the gain between tire steer angle and steering wheel angle δ, u is vehicle longitudinal speed, L is wheel base, and ω is vehicle yaw rate. Yaw rate can be estimated in any convenient way, such as from wheel speed.

In an ideal situation, the processing result from branch 84 should be the same as that from branch 68. In actuality, there is apt to be some difference. Too great a difference may indicate that the yaw rate sensor signal may not be indicative of true yaw rate. Hence, if the processing result provided by branch 68 exceeds the threshold against which it is being compared by step 70, then the processing result provided by branch 84 is compared against a threshold by a step 92. If the comparison shows that the threshold has not been exceeded, then on the basis of the result from branch 84, steps 72 and 74 proceed, in the same manner described above. In effect, the wheel-speed-derived yaw rate substitutes for the yaw rate sensor signal.

Ultimately then, if the processing result of either branch 68, 84 did not exceed the respective threshold, and steps 72 and 74 show that the steering wheel is not being turned too fast, the confidence counter is incremented, as indicated by step 94. On the other hand, if the processing results of both branches 68, 84 exceeded their respective thresholds, then the counter is decremented as shown by step 96.

A final step 98 compares the count in the counter against a threshold. So long as the count remains above the threshold, the vehicle stable flag remains set to designate vehicle state as stable. When the count drops below the threshold, the vehicle stable flag is not set, thereby designating vehicle state as other than stable.

Figure 3:
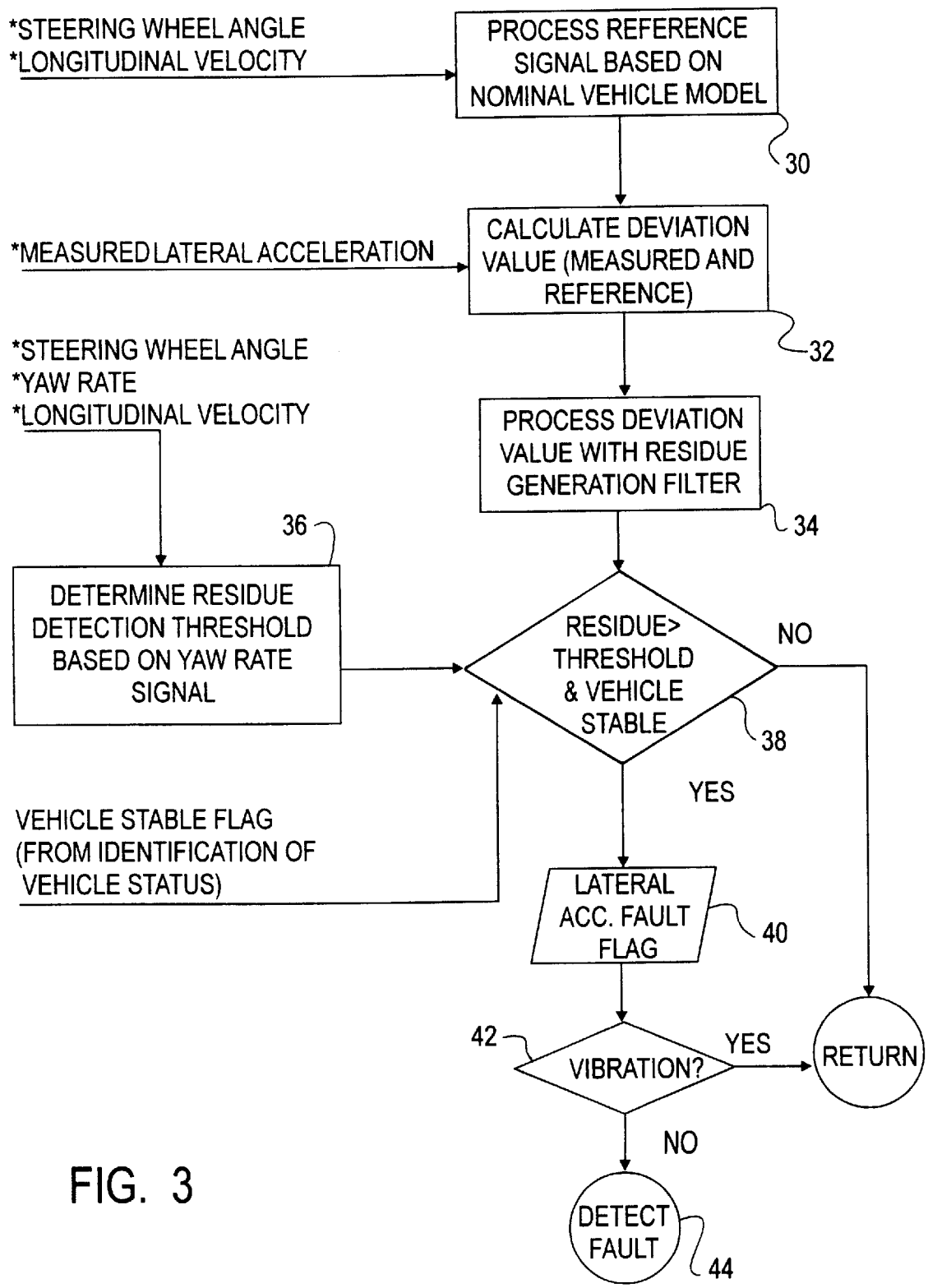
FIG. 3 is a schematic flow diagram illustrating principles of abrupt bias fault detection in a lateral acceleration sensor in accordance with the present invention.

For detecting an abrupt bias fault in lateral acceleration sensor 26, the series of programmed algorithms represented by FIG. 3 is executed. The steps of FIG. 3 are like those of FIG. 2, except that the roles of the yaw rate sensor and the lateral acceleration sensor are reversed. In other words sensor 24 becomes the lateral acceleration sensor, and sensor 26, the yaw rate sensor. In view of the detailed description of FIG. 2, it is believed that the method shown by FIG. 3 is self-explanatory.

Figure 6:
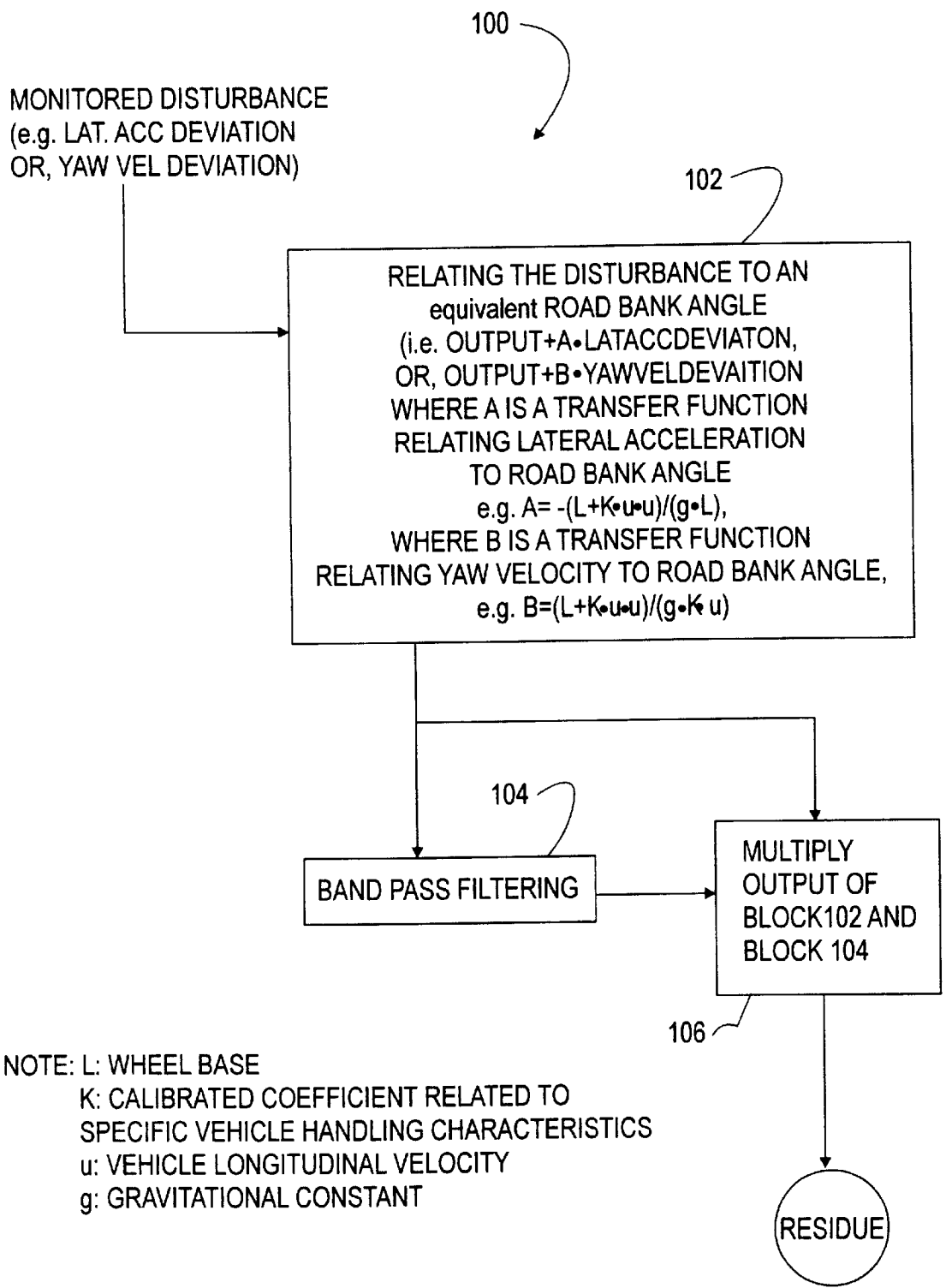
FIG. 6 is a schematic flow diagram showing more detail of another of the blocks in the flow diagrams of both FIGS. 2 and 3.

FIG. 6 shows an example of a software residue filter 100. Given the detail of the formulae presented by FIG. 6, only a few further comments need be made. Briefly, step 102 is a calculation that takes into account the various factors shown, for the purpose of amplifying abrupt changes in deviation of the sensor signal, i.e., abrupt deviation in the signal of the yaw rate sensor in FIG. 2 and abrupt deviation in the signal of the lateral acceleration sensor in FIG. 3. In effect, the processing of step 102 at least approximately normalizes the deviation for vehicle longitudinal velocity. By then passing the approximately normalized deviation signal through a band pass software filter as described by step 104, the magnitude of deviation at a frequency of interest is obtained. By then calculating the product of the results of steps 102, 104 in a processing step 106, the value of the residue is determined.

Because an abrupt bias fault is characterized by a relatively much higher frequency component in the sensor signal, step 106 creates the residue by effectively weighting the value of the approximately normalized deviation signal by its relatively higher frequency component at the frequency of interest. It is believed that this residue calculation process is useful in promptly and accurately distinguishing an abrupt bias fault, which can then be immediately confirmed by the vehicle stable flag being set and by the vibration check of step 42 essentially ruling out that the abrupt change was due to vibration.

While a presently preferred embodiment has been illustrated and described, it is to be appreciated that the invention may be practiced in various forms within the scope of the following claims.

What is claimed is:

1. A system for detecting an abrupt bias fault in an on-board motion sensor in an automotive vehicle, the system comprising, in combination with such sensor:

signal sources that are independent of the sensor, including signal sources providing signals useful in calculat ing a motion that at least approximately corresponds to motion represented by a signal of the sensor; and a processor a) for processing the signals from the sensor and from the sources that are independent of the sensor to yield a calculation at least approximately corresponding to motion represented by the signal of the sensor;

b) the processor further processing the calculation and the signal from the sensor to calculate deviation of one from the other; and c) the processor further processing the calculated deviation for distinguishing a frequency component indicative of such an abrupt bias fault from a frequency component that is not indicative of such a fault.

2. A system as set forth in claim 1 in which the processor, upon having distinguished said frequency component indicative of said abrupt bias fault, processes the sensor signal for noise induced by vehicle vibration to either validate or invalidate the distinguished frequency component indicative of said abrupt bias fault.

3. A system as set forth in claim 1 in which the signal sources include signal sources useful in distinguishing a stable state of the vehicle from a state other than said stable state; and the processor further processes a) signals from the signal sources useful in said distinguishing a stable state of the vehicle from a state other than said stable state and b) the result of the processing of the calculated deviation that distinguished said frequency component indicative of such an abrupt bias fault from a frequency component not indicative of such a fault.

4. A system as set forth in claim 3 in which the processor, upon having distinguished said frequency component indicative of said abrupt bias fault, processes the sensor signal for noise induced by vehicle vibration to either validate the distinguished frequency component as a true fault or invalidate the distinguished frequency component as a false fault, and signals the occurrence of said true fault in consequence of both fault validation by the noise processing and determination of stable vehicle state.

5. A system as set forth in claim 1 in which the processor at least approximately normalizes the calculated deviation for longitudinal vehicle velocity, processes the approximately normalized calculated deviation to obtain its value at a frequency of interest, and weights the value of the approximately normalized deviation by its value at the frequency of interest to create a residue.

6. A system as set forth in claim 5 in which the processor compares the residue to a threshold for distinguishing a residue that is indicative of said abrupt bias fault from a residue that is not indicative of said abrupt bias fault.

7. A system as set forth in claim 6 in which the processor processes the sensor signal and signals from at least some of the other signal sources a) for noise induced by vehicle vibrations and b) for distinguishing said stable state of the vehicle from a state other than said stable state, and the processor signals a true abrupt bias fault when vibrations are below a certain vibration threshold, the vehicle state is stable, and the residue is indicative of said abrupt bias fault.

8. A method for detecting an abrupt bias fault in an on-board motion sensor in an automotive vehicle, the method comprising:

processing signals from signal sources that are independent of the sensor to calculate a motion that at least approximately corresponds to motion represented by a signal of the sensor;

calculating deviation between the sensor signal and the calculated motion; and processing the calculated deviation for distinguishing a frequency component indicative of such an abrupt bias fault from a frequency component that is not indicative of such a fault.

9. A method as set forth in claim 8 including processing for noise induced by vehicle vibration to either validate or invalidate the distinguished frequency component indicative of said abrupt bias fault.

10. A method as set forth in claim 8 including processing signals from signal sources useful in distinguishing a stable state of the vehicle from a state other than said stable state.

11. A method as set forth in claim 10 including processing the sensor signal for noise induced by vehicle vibration to either validate the distinguished frequency component as a true fault or invalidate the distinguished frequency component as a false fault, and signaling the occurrence of said true fault in consequence of both fault validation by the noise processing and determination of stable vehicle state.

12. A method as set forth in claim 8 including at least approximately normalizing the calculated deviation for longitudinal vehicle velocity, processing the approximately normalized calculated deviation to obtain its value at a frequency of interest, and weighting the value of the approximately normalized deviation by its value at the frequency of interest to create a residue.

13. A method as set forth in claim 12 including comparing the residue to a threshold for distinguishing another residue that is indicative of said abrupt bias fault from a residue that is not indicative of said abrupt bias fault.

14. A method as set forth in claim 13 including processing the sensor signal and signals from at least some of the other signal sources a) for noise induced by vehicle vibrations and b) for distinguishing a stable state of the vehicle from a state other than said stable state, and signaling a true abrupt bias fault when vibrations are below a certain vibration threshold, the vehicle state is stable, and the residue is indicative of said abrupt bias fault.

\* \* \* \* \*